Aug. 30, 1927.　　　　E. G. LOOMIS　　　　1,640,949
BLOCK PRESS
Filed Dec. 9, 1925　　　　2 Sheets-Sheet 1

INVENTOR
EVARTS G. LOOMIS
BY
ATTORNEY

Aug. 30, 1927.

E. G. LOOMIS

BLOCK PRESS

Filed Dec. 9, 1925

INVENTOR
EVARTS G. LOOMIS
BY
ATTORNEY

Patented Aug. 30, 1927.

1,640,949

UNITED STATES PATENT OFFICE.

EVARTS G. LOOMIS, OF NEWARK, NEW JERSEY.

BLOCK PRESS.

Application filed December 9, 1925. Serial No. 74,281.

The object of my invention is to provide a press of this character which may be used for forming celluloid, casein, rubber compounds and other similar plastic materials into solid masses called cakes or blocks, which cakes or blocks adhere to a rigid metal base known as a cake plate. From this press this block and base go to suitable machinery for cutting the cake into sheet or rod form. It will be understood that such presses operate on large masses at great pressures and so they have to be correspondingly rigid and tight to function properly and without loss of material through leakage. My invention greatly reduces the weight of material employed in such presses without sacrificing strength or rigidity and distributes the same so that it is most effective in taking the various tensile compressive and bending stresses. Such presses act on blocks of plastic material which are generally about thirty to sixty inches long, twenty-four inches wide and three to ten inches thick and apply heat and at the same time pressures of about three hundred and fifty pounds or more to the square inch.

For a more detailed description of my invention, reference is to be had to the accompanying drawings, forming a part hereof, in which Figure 1 is a sectional view of a press embodying my invention.

Throughout the various views of the drawings, similar reference characters designate similar parts.

Figure 1:
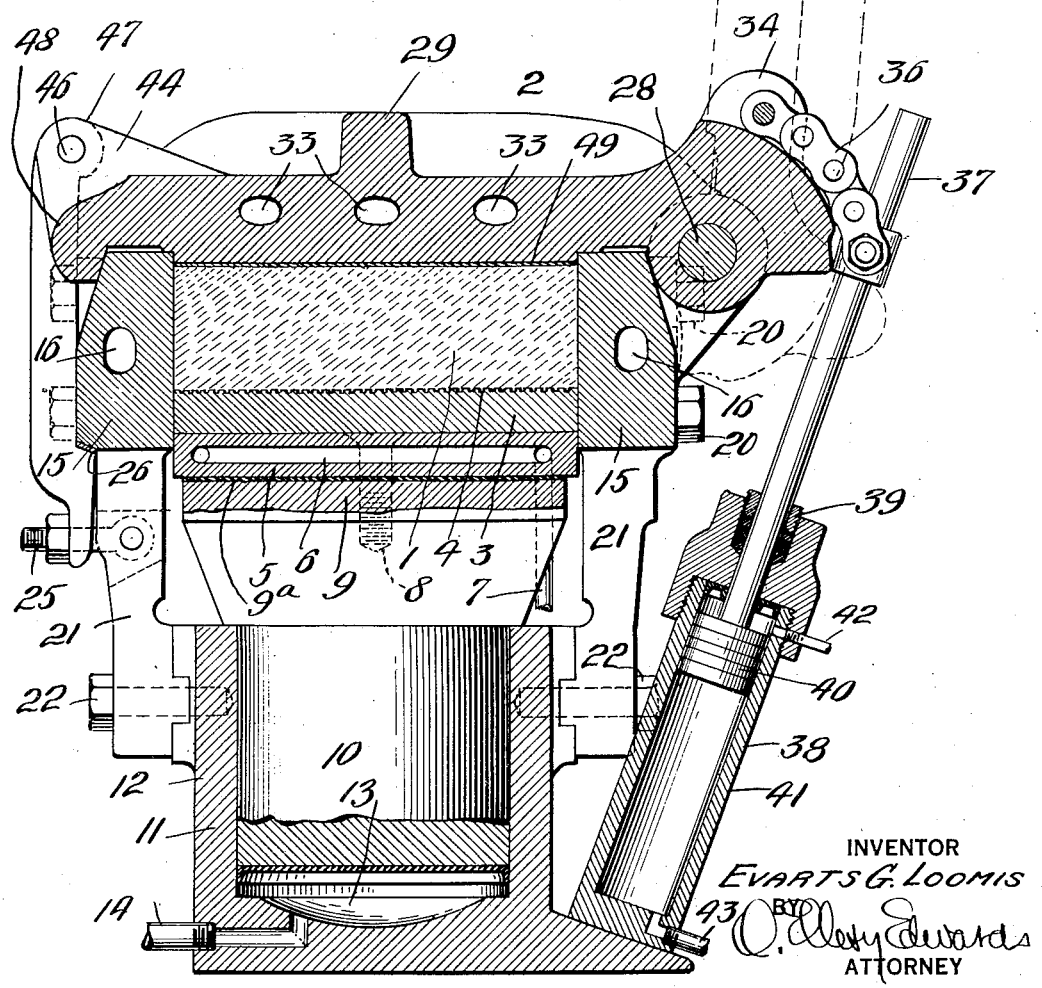
Figure 2:
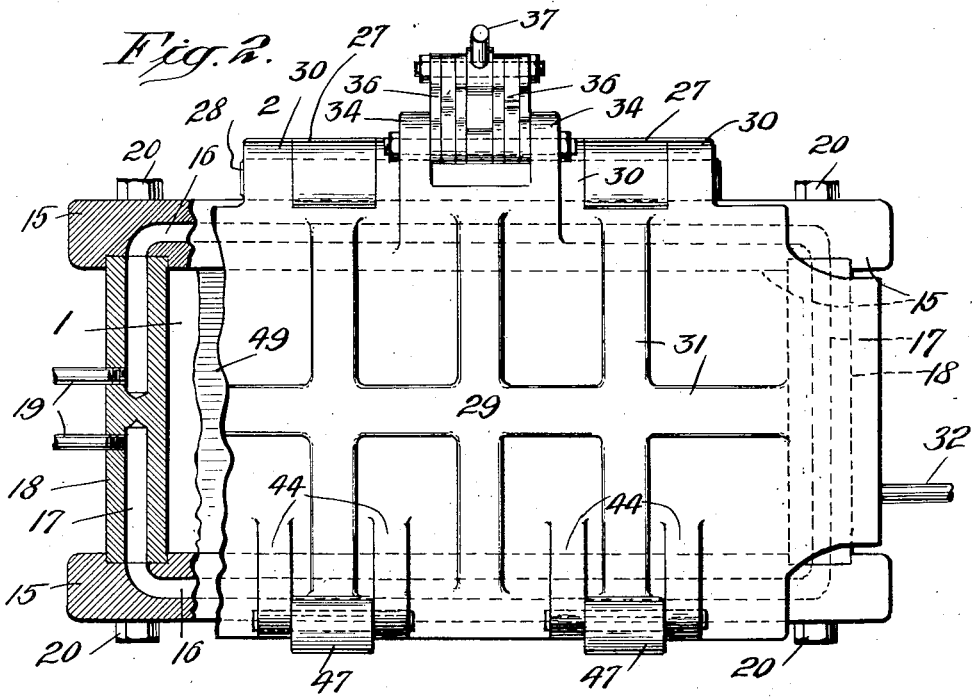
Figure 2 is a plan view of the same.
Figure 3:
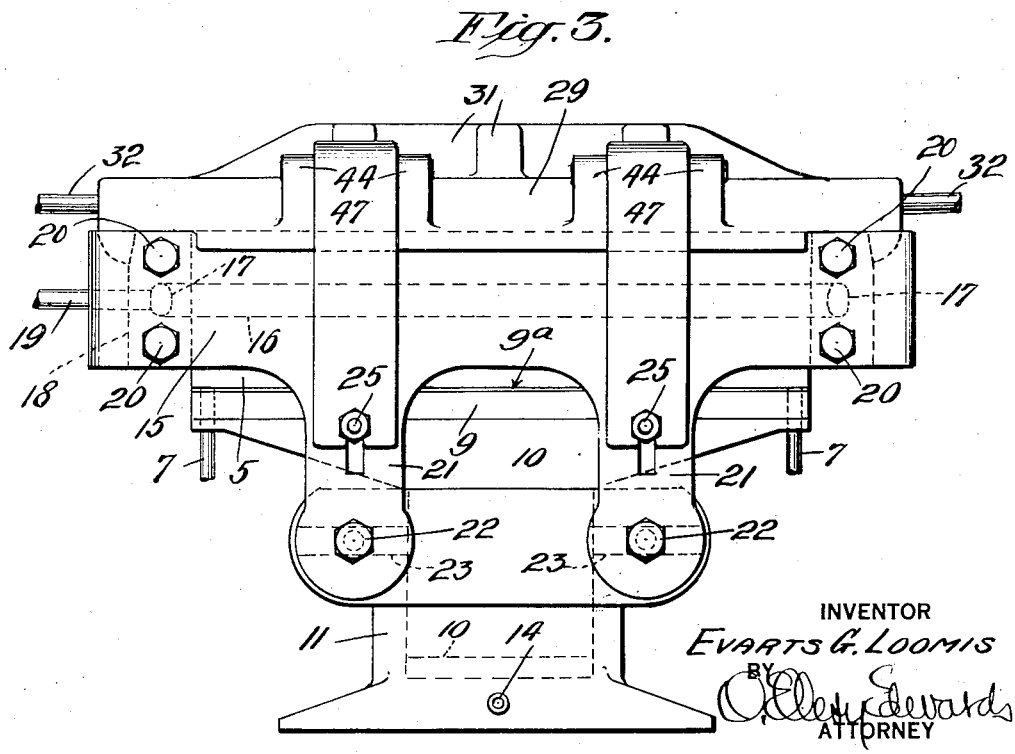
Figure 3 is a side elevation of this structure.

The material 1 which is acted on by the press 2 is brought to the press in a plastic condition from the rolls where the materials have been mixed to a uniform consistency. In this form this material is irregular, rough and more or less mixed with air. In order to expel the air and mould this mass into a homogeneous cake it is necessary to put it under a pressure of about three hundred and fifty pounds per square inch or more, while in a heated condition. To properly treat this material, it is compressed in the press 2 while on a base or cake plate 3 which has a ribbed upper surface 4 with grooves into which the cake is pressed so as to be firmly held.

The ram.

This cake plate 3 rests on a heating plate 5 with suitable passages 6 which run to connections 7 by means of which the plate 5 may be brought to any desired temperature during the functioning of the apparatus. At times hot water or steam is passed through this plate to heat the same and at times cold water is passed through to cool it. It has suitable perforations through which pass suitable screws 8 which hold this plate 5 firmly on the head 9 (but separated therefrom by asbestos or other suitable insulation 9ª) of the plunger 10. This plunger 10 slides freely in a suitable cylinder 12 and this cylinder casting also forms the base of the press 2. Below the piston 10 is a space 13 which may be supplied by a liquid under pressure by means of a suitable passage 14 at the bottom of the cylinder.

The sides and ends of the press chase.

The sides 15 of this press are also provided with suitable passages 16 through which hot or cold fluids may be passed and these passages are connected to corresponding passages 17 in the ends 18 of this press. Suitable pipes 19 permit the inflow and outflow of the heating and cooling fluids, as is obvious. The ends 18 are secured to the sides 15 by means of suitable bolts or cap screws 20 and also suitable recesses in which the ends fit and enough of these bolts are used to hold these parts in rigid relation. These sides and ends form what is commonly known in the art as a chase.

The sides 15 are extended downwardly at 21 and perforated so that bolts 22 may pass therethrough. They are also provided with tenons 23 which take into suitable mortises in the base 11 and fit tight therein and these are held in place by the bolts 22, above described. The result of this is that the sides are very rigidly held to the base for a purpose which will appear below.

Two of the projections 21 are recessed at 24 to receive the swinging bolts 25 which are mounted, as shown, and are used to hold the cover, as will appear below. Above these bolts 25 are suitable shoulders 26 which function so as to hold the cover in place. This shoulder 26 is slightly inclined for a purpose that will appear below.

The other side 15 carries suitable ears 27 near its top for the purpose of forming a portion of the hinges for the cover, these ears being perforated to receive the pivot 28 of the hinges.

The cover.

The cover 29 has suitable projections 30 which take between the ears 27 and about the pivot 28 so that the cover is hinged to swing true. For the purposes of giving adequate strength, this cover is suitably ribbed, as indicated at 31, and for the purposes of heating and cooling it is provided with suitable inlet and outlet pipes 32 which run to suitable passages 33 by means of which the fluids may be passed for heating and cooling. This cover has a pair of projecting ears 34 between which passes a pin 35 that is connected to a chain 36. This chain is also pivotally connected to the piston rod 37 of a cylinder 38, which is fixed to the cylinder 11, as shown in Figure 1. This piston rod 37 passes through a suitable stuffing box 39 to a piston head 40 mounted in the cylinder 41 at the top of which is the stuffing box above described. There are suitable inlet and outlet pipes 42 and 43 so that fluid pressure may be applied on either side of the piston 40 in the small cylinder 38 so that by applying pressure through a suitable valve, not shown, the cover may be raised or lowered.

This cover 29 has, at its edge remote from the ears 34, another set of ears 44 and these carry a pivot 46 which also engage the upper ends of links 47 which extend through slots in the edge 48 of the cover 29 and downwardly to the bolts 25, these links being shaped as shown in Figure 1, each formed so as to have a projection engaging the projection 26 and a slot to receive the bolt 25. The upper edges of the sides 15 and ends 18 are tapered and carefully fitted to corresponding engaging surfaces 50 of the cover so that as the bolt 25 is tightened the inclination of the shoulder 26 will cause a slight downward movement of the link 47 and thereby cause the inclined inner edges of the cover to press very firmly against the upper edge of the sides 15 and ends 18 and reinforce the same against the internal outward pressure. Furthermore, the engagement of the upper edges of the sides 15 with the edges 50 of the cover form fulcra, the sides 15 and projections 21 acting as levers so that the bolts 22 can easily hold the sides true when internally pressed against by the material in the chase. Furthermore, the mortise and tenon connections 23 cause the base and cover to be held in proper relation.

All joints between the sides and cover and ram and about the cake 1 are made true, so that there will be no leakage through them when the press is functioning.

Operation.

In view of the foregoing, the operation of my improved press will be readily understood. Pressure is applied through the pipe 42 of the cylinder 38 and an exhaust occurs through the pipe 43. This causes the piston 37 to descend and when descending it will raise the cover 29, assuming that the cover is free to move as it is when the links 47 are released from the swinging bolts 25. Once the cover is raised, pressure is applied through the passage 14 and the ram is raised until the base 3 can be put in place with convenience and without injury to the finished surfaces on the plate 5, after which pressure is withdrawn through the passage 14 and the plunger 10 of the cylinder 11 falls to the lower limit of its movement. The plastic material to be acted upon is then put in place and the surfaces of the sides and ends 15 and 18, which are to come in contact with the cover 29, are carefully cleaned, a sheet of metal 49, or other suitable material, is placed on the block 1 so as to prevent contact with the cover 29 and thereafter the cylinder 38 functions so as to lower the cover 29 and when the cover 29 is in place, the links 47 are properly secured by the swing bolts 25. Heat is then applied through the pipes 7, 19 and 32 and pressure is applied through the passage 14 and this heat and pressure is applied for any time that may be necessary to compress the plastic mass into the desired condition. After this pressure has been exerted the requisite time, the heating fluids are withdrawn and cooling fluids are applied through the same pipes and further pressure is applied and thereupon the mass hardens and solidifies and thereafter, when the proper cooling is had and the mass is solid and firm, the swing bolts 25 are released and the links 47 are freed so that the cover may be raised, in the above described manner, through the action of the cylinder 38. After this occurs the plunger 10 is raised through pressure exerted through the passage 14 until the platen 5 is clear of the top of the sides and edges and thereafter the plate 3 is removed with the block 1 resting and fixed thereon and a new block substituted and thereafter the press functions as before.

It will be noted that throughout these operations there can be no leakage of valuable material from the block 1 because all joints are tight and held tight because the parts of the press that contain the block are pressed so as to react against each other and the block 1, that is, in addition to pressures through the block 1, one side 15 will react against the other side 15 and end 18 against the end 18 through the cover 29 and the base 11 through the arms 21 which thus serve as tension members for resisting the reaction between the ram 10 and the cover 29, and also as lever arms holding the lower edges of the chase sides 15 from spreading, so that no matter what the pressure may be there will be no leakage and all this is accomplished with a minimum amount of metal in the press which is carefully designed so as to economize in this respect, as above pointed out.

Conclusion.

While I have shown and described one embodiment of my invention, it is obvious that it is not restricted thereto, but that it is broad enough to cover all structures that come within the scope of the annexed claims.

Having thus described my invention, what I claim is:

1. In a press of the class described, a cylinder base, a chase fixed to said cylinder base, a cover hinged to said chase, means on said cover for holding the sides together at the top when under high pressure, links pivotally connected to said cover and means for securing said links so that they will secure the cover to prevent leakage under high pressure.

2. In a press of the class described, a cylinder base, a chase fixed to said cylinder base, a cover hinged to said chase, means on said cover for holding the sides true at the top when under high pressure, links pivotally connected to said cover, means for securing said links to secure the cover so that there will be no leakage under high pressure and means for raising and lowering the cover.

3. In a press of the class described, a cylinder base, a chase having projecting parts engaging said cylinder base through mortise and tenon joints, a cover hinged at one side of said chase, projections on the edges of said cover adapted to engage the sides and ends of said chase and hold the same firmly, links secured to said cover on the side remote from said hinge and means for holding the links firmly so as to make them secure the cover.

4. In a press of the class described, a cylinder base, a chase secured to said cylinder base, a cover hinged at one side of said chase, a link pivotally connected to the cover on the side opposite the hinge, an inclined surface on said link adapted to engage a corresponding surface on the chase and means for forcing said inclined surfaces into close engagement, whereby the cover is brought in close contact with the chase.

5. In a press of the class described, a hydraulic cylinder, a chase, a cover hinged to said chase, means for causing the cover to engage the chase with a reinforcing and tight contact and a second hydraulic cylinder connected to said cover for raising or lowering the same, the said second cylinder being held in rigid relation with the first cylinder.

6. In a press of the class described, a cylinder base, a chase mounted on said cylinder base and held in rigid relation thereto, a ram, a cover hinged to one side of said chase and means for causing the cover to engage the sides of the chase with a reinforcing and tight effect and means for heating or cooling the cover chase and head of ram.

7. In a press of the class described, a cylinder base, a ram, a plate resting on the plunger of this ram, a chase fixed to said cylinder base and supported thereby and adapted to engage said plate, a cover hinged at one side of said chase and adapted to engage the chase with a tight joint and means for causing the cover to be held so that it will reinforce the chase.

8. In a press of the class described, a cylinder base, a plunger operating in said cylinder base, a plate resting on the plunger, a chase fixed to said cylinder base and supported thereby and adapted to engage said plate, a cover hinged at one side of said chase and adapted to engage the chase with a tight joint, means for causing the cover to be held so that it will reinforce the chase and means for raising and lowering the cover.

9. In a press of the class described, a chase, means for applying pressure to plastic material in said chase, a hinged cover provided with surfaces engaging opposing surfaces of said chase to prevent the sides of said chase spreading as a result of the internal pressure of said material.

10. In a press of the class described, a chase, means for applying pressure to plastic material in said chase, a cover with projecting inclined lips arranged to engage inclined surfaces on the exterior of sides of said chase to prevent spreading of said sides as a result of the internal pressure, said cover being hinged on one side of said chase and secured on opposite side by means of suitable links.

11. In a press of the class described, a chase, a means for closing said chase after loading with material, a platen operated by means of a hydraulic ram and cylinder to apply pressure to material in said chase, downwardly extending arms from the opposite sides of said chase, means for securing together such oppositely disposed arms to resist the spreading tendency of the sides of said chase due to the internal outwardly pressure of the material.

12. In a press of the class described, a chase for containing the material to be blocked, means for providing a closure to the top of said chase, a hydraulic ram having a platen top fitting the inside of said chase and arranged by its upward motion to compress said material in said chase, oppositely disposed arms extending downwardly from sides of said chase and secured together below said platen in such a manner as to resist the tendency of the sides of said chase to spread due to the internal outwardly pressure of the material.

13. In a press of the class described, a chase for containing the material to be blocked, a cover accurately fitting the upper surface of said chase and arranged to be rigidly secured to it by any suitable means, a ram having mounted on it a platen top fitting the inside of said chase and designed by its upward motion to compress said material in said chase, said ram operating in a hydraulic cylinder in the base of the press, downwardly extending arms from the opposite sides of said chase each secured to said cylinder base of press in such a manner as to serve at the same time as tension members to resist the upward pressure of the material on the cover of the chase and as lever arms to prevent the spreading of the sides of the chase.

14. In a press of the class described a chase, a ram acting to apply pressure on material inside said chase, a cover provided to close upper opening of said chase and at the same time to resist the spreading tendency of the sides of the chase, arms extending downwardly from the sides of said chase and acting to support the chase from the base of the machine, to resist the pressure of the said material against the chase cover and to tie together the opposite chase sides to resist spreading action due to internal pressure of the material.

15. In a press of the class described a chase, a ram acting to apply pressure on material inside said chase, a cover provided to close upper surface of said chase and at the same time to resist the spreading tendency of the sides of the chase, arms extending downwardly from the sides of said chase and acting to support the chase from the base of the machine, to resist the pressure of said material against the chase cover and to tie together the opposite chase sides to resist spreading action due to internal pressure of the material and means for alternately heating and cooling the chase, the cover and the platen of said press.

In testimony whereof, I have hereunto set my hand this 7th day of December, 1925.

EVARTS G. LOOMIS.